(12) United States Patent
Ichinose et al.

(10) Patent No.: US 6,524,666 B1
(45) Date of Patent: Feb. 25, 2003

(54) NEMATIC LIQUID CRYSTAL COMPOSITION FOR ACTIVE MATRIX APPLICATION AND REFLECTIVE LIQUID CRYSTAL DISPLAYS

(75) Inventors: Hideo Ichinose, Odawara (JP); Shinji Nakajima, Atsugi (JP); Akiko Takashima, Aikawa-machi (JP); Masako Nakamura, Yamatokoriyama (JP); Yoshito Hashimoto, Ikoma (JP); Makoto Kanbe, Tenri (JP)

(73) Assignees: Merck Patent Gesellschaft, Darmstadt (DE); Sharp Corporation (JP)

( * ) Notice: Subject to any disclaimer, the term of this patent is extended or adjusted under 35 U.S.C. 154(b) by 0 days.

(21) Appl. No.: 09/505,685

(22) Filed: Feb. 17, 2000

(30) Foreign Application Priority Data

Feb. 17, 1999 (EP) .................................. 99103083

(51) Int. Cl.$^7$ ...................... C09K 19/30; C09K 19/20; C09K 19/42; G02F 1/13
(52) U.S. Cl. .............. 428/1.3; 252/299.63; 252/299.67; 428/1.1; 349/177; 349/180; 349/181; 349/186
(58) Field of Search ................. 252/299.63, 299.67; 349/130, 176, 177, 179, 181, 180, 186; 428/1.1, 1.3

(56) References Cited

U.S. PATENT DOCUMENTS

| | | | | |
|---|---|---|---|---|
| 5,868,962 A | * | 2/1999 | Rieger et al. | 252/299.63 |
| 5,965,060 A | * | 10/1999 | Tarumi et al. | 252/299.63 |
| 5,976,407 A | * | 11/1999 | Tarumi et al. | 252/299.01 |
| 5,985,171 A | * | 11/1999 | Rieger et al. | 252/299.63 |
| 5,993,691 A | * | 11/1999 | Pausch et al. | 252/299.63 |
| 5,993,692 A | * | 11/1999 | Tarumi et al. | 252/299.63 |
| 5,997,767 A | * | 12/1999 | Hirschmann et al. | 252/299.63 |
| 6,028,655 A | * | 2/2000 | Weber et al. | 349/182 |
| 6,108,064 A | * | 2/2000 | Minoura et al. | 349/130 |
| 6,036,884 A | * | 3/2000 | Tarumi et al. | 252/299.63 |
| 6,045,878 A | * | 4/2000 | Tarumi et al. | 428/1 |
| 6,054,193 A | * | 4/2000 | Hirschmann et al. | 428/1 |
| 6,056,894 A | * | 5/2000 | Hirschmann et al. | 252/299.63 |
| 6,266,108 B1 | * | 7/2001 | Bao et al. | 349/63 |

FOREIGN PATENT DOCUMENTS

DE 19625100 A1 * 1/1998

OTHER PUBLICATIONS

Derwent abstract 1998–063944.*

* cited by examiner

Primary Examiner—Shean C. Wu
(74) Attorney, Agent, or Firm—Millen, White, Zelano & Branigan, P.C.

(57) ABSTRACT

The invention relates to dielectrically positive nematic liquid crystal compositions for active matrix displays with high voltage holding ratio and very low birefringence. The composition of the mixtures is given in claim 1. The compositions are particularly suited for reflective displays. The invention further relates to particular reflective displays with low optical retardation.

24 Claims, 2 Drawing Sheets

NEMATIC LIQUID CRYSTAL COMPOSITION FOR ACTIVE MATRIX APPLICATION AND REFLECTIVE LIQUID CRYSTAL DISPLAYS

SUMMARY OF THE INVENTION

The invention relates to nematic liquid crystal compositions with positive dielectric anisotropy, high voltage holding ratio and very low birefringence. They are suited for active matrix application and especially suited for reflective displays. The invention also relates to liquid crystal displays comprising the liquid crystal mixtures and to reflective liquid crystal displays with low optical retardation and with improved properties.

Active matrix displays (AMDs) are highly favored for displays with high information content. They are widely used for screens for small portable TV sets and for monitors for laptop computers. Recently they are even entering the desktop monitor domain, which is more demanding, at least with respect to optical performance. However, through AMDs do require only very little power to display information, which is a feature characteristic for almost all LCDs, their use in mobile displays so far is rather limited. The main reason for this is the fact that the intrinsically passive (not-light emitting) LCDs are equipped with a rather power consuming back light. This does even severely limit the active operation times of portable TVs and of laptop computers. And it has proven prohibitive so far to the introduction of high information content LCDs, in particular of AMDs to most battery driven applications.

Thus there is a substantial need for reflective mode AMDs with good optical performance. Liquid crystal mixtures for application in AMDs are already known e.g. from EP 365,962, EP 406,468, EP 473,821, EP 502,406, DE 4,426,904, DE 4,426,905 and EP 770,117.

Though the mixtures disclosed in the prior art, especially the documents cited above, are already characterized by a reasonable or even good voltage holding ratio, they generally have birefringence values ($\Delta n$) which are too high for displays in reflective mode. This does by no means only hold for those patent applications directed to projection type LCDs like EP 770,147, but applies quite generally to the known liquid crystal mixtures.

Even if in the mixture concepts of the prior art there are various possibilities to reduce the birefringence of the liquid crystal mixtures, these are accompanied by undesired and even not tolerable side effects like increases in the characteristic voltages and/or decreases of the stability of the nematic phase especially at low temperatures.

Furthermore, liquid crystal mixtures for reflective AMDs preferably have suitable dielectric properties such as $\Delta \epsilon$ at 20° C. of at least 5 and prefeably of less than 13, and $\Delta \epsilon$ at 20° C. of at most 7 (all at 1 kHz).

The inventive liquid crystal mixtures are especially suited for active matrix addressed LCDs, e.g. operating in the "first minimum" TN-mode, as disclosed in DE 3,022,818.

It has now been found that, surprisingly, this task could be achieved by using a liquid crystal mixture which comprises 5 to 15 % of one or more compounds from group 1:

group 1:

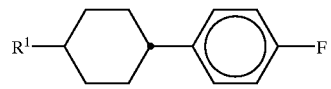

wherein $R^1$ denotes a straight-chain alkyl group of 5 to 7 carbon atoms;

30 to 40% of two or more compounds from group 2:

group 2:

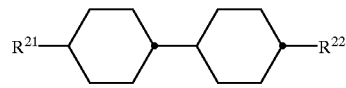

wherein $R^{21}$ denotes a straight-chain alkyl group of 3 to 7 carbon atoms and $R^{22}$ denotes a straight-chain alkoxy group of 1 to 3 carbon atoms or an 1 E-alkenyl group with 2 or 3 carbon atoms;

25 to 35 % of three or more compounds from group 3:

group 3:

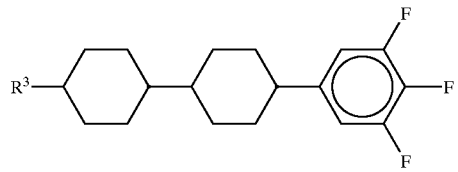

wherein $R^3$ denotes a straight-chain alkyl group of 2 to 5 carbon atoms;

10 to 20% of two or more compounds from group 4:

group 4:

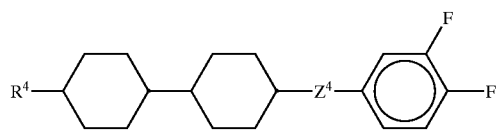

wherein $R^4$ denotes a straight-chain alkyl group or a 1 E-alkenyl group, both with 2 or 3 carbon atoms and $Z^4$ denotes a —$CH_2CH_2$— group or a single bond;

8 to 12% of three compounds of group 5:

group 5:

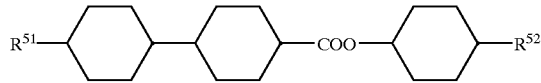

wherein $R^{51}$ denotes n-alkyl with 3 or 4 carbon atoms and $R^{52}$ denotes n-alkyl with 3 or 5 carbon atoms; and 4 to 8% of two or more compounds of group 6:

group 6:

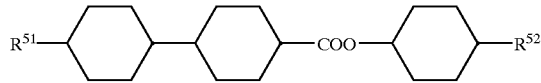

wherein $R^{61}$ denotes n-alkyl with 3 carbon atoms and $R^{62}$ denotes n-alkyl with 3 or 4 carbon atoms.

Preferably the liquid crystal mixture contains
one compound from group 1, preferably with $R^1$ n-heptyl;
one compound each of subgroups 2a and 2b Subgroup 2a:

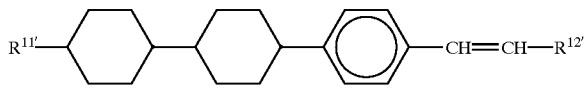

wherein $R^{11'}$ denotes straight-chain alkyl with 3 or 5, preferably 5, carbon atoms and $R^{12'}$ denotes H or $CH_3$, preferably H, Subgroup 2b:

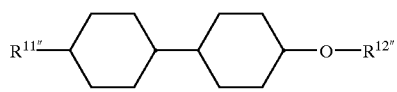

wherein $R^{11''}$ denotes straight-chain alkyl with 3 or 5, preferably 5, carbon atoms, and $R^{12''}$ denotes straight-chain alkyl with 1 or 2, preferably 1, carbon atoms;

three compounds of group 3, preferably with $R^3$ ethyl, n-propyl and n-pentyl, respectively;

one compound each of subgroups 4a and 4b:

Subgroup 4a:

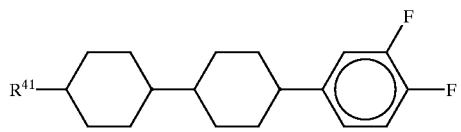

wherein $R^{41}$ denotes n-alkyl with 2 to 5 carbon atoms or preferably 1 E-alkenyl with 2 or 3, preferably 2, carbon atoms Subgroup 4b:

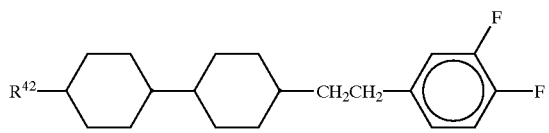

wherein $R^{42}$ denotes n-alkyl with 2 or 3, preferably 3, carbon atoms;

three compounds of group 5, and two compounds of group 6.

The preferred concentration ranges for the compounds of groups 1 to 6 are as given in the following table (Table 1).

TABLE 1

Preferred concentration ranges of groups respectively subgroups

| group | concentration/% |
| --- | --- |
| group 1 | 6 to 12 |
| group 2 | 31 to 35 |
| group 3 | 28 to 33 |
| group 4 | 12 to 16 |
| group 5 | 8 to 12 |
| group 6 | 4 to 8 |

TABLE 1-continued

Preferred concentration ranges of groups respectively subgroups

| subgroup | concentration/% |
| --- | --- |
| group 2a | 15 to 20 |
| group 2b | 14 to 18 |
| group 4a | 8 to 10 |
| group 4b | 5 to 8 |

The preferred concentration ranges of the subgroups 2a, 2b, 4a and 4b are also given in Table 1.

The inventive mixtures have a nematic phase range from at least −20 ° C. to 80 ° C. preferably from at least −30 ° C. to 85 ° C.

The liquid crystal compositions according to the instant invention can contain suitable additives known to the expert such as e.g. chiral dopants and dyes. The preferred concentrations for these additives is 0 to 3%, preferably 0.1 to 1% per compound and 0 to 10%, preferably 0.1 to 3% total for all additives, relative to the other components.

When the concentrations of the other components of the liquid crystal mixture are specified the additives are not considered.

The compounds used in the inventive mixtures and their preparation is know to the expert or they are prepared analogously to known compounds.

The compounds of groups 1 to 5 especially are known from EP 0 003 215, EP 0 014 840, EP 0 087 032, EP 0 122 389, EP 0 125 563, EP 0 132 553 and EP 0 441 932.

All physical properties in this application relate to and are determined at a temperature of 20° C., all concentrations are given in mass %, both unless explicitly stated otherwise.

The physical properties of the liquid crystals and of the displays have been determined as described in "Merck Liquid Crystals, Physical Properties of Liquid Crystals, Description of the Measurement Methods" ed. W. Becker, states November 1997, unless explicitly stated otherwise.

The characteristic optical properties have been determined in TN test cells manufactured by Merck KGaA, however also commercially available cells may be used, with crossed polarizes, perpendicular to the rubbing direction of the adjacent substrates. The test cells had orientation layers of AL-1051 from Japan Synthetic Rubber Co., Japan. Characteristic voltage values for 10%, 50% and 90% relative contracts have been determined using a He-Ne layer as a light source.

Storage tests at deep temperature have been performed in sealed test cells of the same type used for the electro-optical investigation, as used in the electrooptical investigations. The test cells were provided with crossed adhesive polarizes. Five test cells were investigated in parallel at several fixed temperatures (−20° C., −30° C. and optionally −40° C.). The time for storage was given as the time at which, after storage at a given temperature, under visual inspection, still none of five test cells showed any defects.

Alternatively, the liquid crystal mixtures were stored in three separate bottles each. The quantity of liquid crystal material was 1 g each in a 3 cm³ bottle. The evaluation was again by inspection by eye.

The preparation of the compositions according to the invention proceeds in conventional manner. In general, the desired amount of the components which are used in the smaller concentrations are dissolved in the components which constitute the main constituent. Alternatively components which are solid at ambient temperature are dissolved in components which are liquid or liquid crystalline at ambient temperature. Preferably the components are heated to accelerate mixing. If the temperature is raised above the clearing point of the complete mixture, or at least of the main constituent, the completeness of the process of dissolving can be easily confirmed.

Another aspect of the present invention is an improved type of reflective display. This improved type of displays is illustrated using FIGS. 1 and 2 as explained below. Thus, the invention encompasses a liquid crystal display that is a reflective liquid crystal display, containing liquid crystals that are oriented in the range of 40° to 90° of the twist angle, and having a liquid crystal layer optical retardation d·Δn of 170 nm to 290 nm.

FIG. 1 is a cross-sectional view of a reflection type liquid crystal display device in an embodiment of the invention, and FIG. 2 is a plane view of the substrate 31 shown in FIG. 1. On an insulating substrate 31 made of glass or the like, plural gate bus wirings 32 made of chromium, tantalum or the like are disposed mutually parallel, and gate electrodes 33 are branched off from the gate bus wirings 32. The gate bus wirings 32 function as scanning lines.

Covering the gate electrode 33, a gate insulating film 34 made of silicon nitride ($SiN_x$), silicon oxide ($SiO_x$) or the like is formed on the entire surface of the substrate 31. On the gate insulating film 34 above the gate electrode 33, a semiconductor layer 35 made of amorphous silicon (a—Si), polycrystalline silicon (p—Si), CdSe or the like is formed. At both ends of the semiconductor layer 35, contact electrodes 41 made of a—Si or the like (preferably of the same material as the layer 35) are formed. On one contact electrode 41, a source electrode 36 made of titanium, molybdenum, aluminum or the like is superposed, and on the other contact electrode 41, a drain electrode 37 made of titanium, molybdenum, aluminum or the like, is superposed. Preferably the material of the drain electrode 37 is the same as that of the source electrode 36.

As shown in FIG. 2, source bus wirings 39 crossing the gate bus wirings 32 across the gate insulating film 34 (compare FIG. 1) are connected to the source electrode 36. The source bus wirings 39 function as signal lines. The source bus wirings 39 are also preferably made of the same metal as the source electrode 36. The gate electrode 33, gate insulating film 34 (FIG. 1), semiconductor layer 35, source electrode 36, and drain electrode 37 compose a thin film transistor (TFT) 40, and this TFT 40 possesses the function of a non-linear electric switching element.

An organic insulating film 42 is formed on the entire surface on the substrate 31, covering the gate bus wirings 32, source bus wirings 39 and TFT 40. In the region for forming reflection electrodes on the organic insulating film 42, bumps 42a of height H in a tapered form with spherical ends are formed, and contact holes 43 are formed in the parts of the drain electrodes 37. In relation to the forming method of the organic insulating film 42, process problems for forming contact holes 43 therein, and to decrease fluctuations of cell thickness when forming the liquid crystal display device 30, the height H of the bumps 42a is desired to be 10 μm or less. Generally, the cell thickness is 10 μm or less. On the region of the organic insulating film 42, which is forming bumps 42a, reflection electrodes 38 composed of aluminum, silver or the like are formed, and the reflection electrodes 38 are connected with drain electrodes 37 in the contact holes 43. An orientation film 44 is formed further thereon.

A color filter 46 is formed on the substrate 45. A red, blue, or green filter, respectively, 46a is formed at the position confronting the reflection electrode 38 on the substrate 31 of the color filter 46, and a black filter 46b is formed at the position not confronting the reflection electrode 38. On the entire surface of the color filter 46, a transparent electrode 47 made of ITO (indium tin oxide) or the like is formed, and an orientation film 48 is formed further thereon.

The two substrates 31, 45 are adhered face to face together so that the reflection electrodes 38 and filters 46a may coincide with each other, and liquid crystal is injected between them, and the liquid crystal layer 49 is formed.

Finally, a retarder and a polarizer (not shown in the figure) are placed in this order on the outside of the substrate 45 (on the opposite side of the liquid crystal layer). The reflection type liquid crystal display device 30 is completed.

A range of display parameters that can give simultaneously sufficient brightness within the visible wavelength band and a white image without coloration has been determined.

That is, the twist angle of liquid crystal layer 49 is set to more than 40 degrees and less than 90 degrees.

Furthermore, by designing the retardation of the liquid crystal layer 49 to be more than 170 nm and less than 290 nm, superior quality of image can be realized. It leads to a brightness of more than 36%. Coloration does not occur according to the definition by the CIE 1931 chromaticity diagram, and the contrast ratio is more than 12, which is sufficient for the color reflection type liquid crystal display.

From the view point of product yield, the cell gap of liquid crystal layer should preferably be more than 2.5 μm, preferably more than 3.0 μm.

The reason is that if the cell gap is less than 2.5 μm, it becomes difficult to control the cell gap, or electric leakage happens between upper and lower electrodes (48, 38). Therefore, Δn for the liquid crystal component is preferably less than 0.116, more preferably less than 0.096 to satisfy the range of the optimum retardation for the liquid crystal layer.

On the other hand decreasing Δn leads to a narrowing of the temperature range of the nematic phase.

As mentioned before, Δn of the liquid crystal component that shows the nematic phase between –20 ° C. and 80 ° C. is more than 0.060.

For the reasons mentioned above, the optimum range of Δn is more than 0.060 and less than 0.116, preferably more than 0.060 and less than 0.096.

The instant invention relates also to reflection type liquid crystal displays that have not only all reflective area in total pixel, but also some part of reflective area besides transmitive area in the single pixies.

Figure 1:
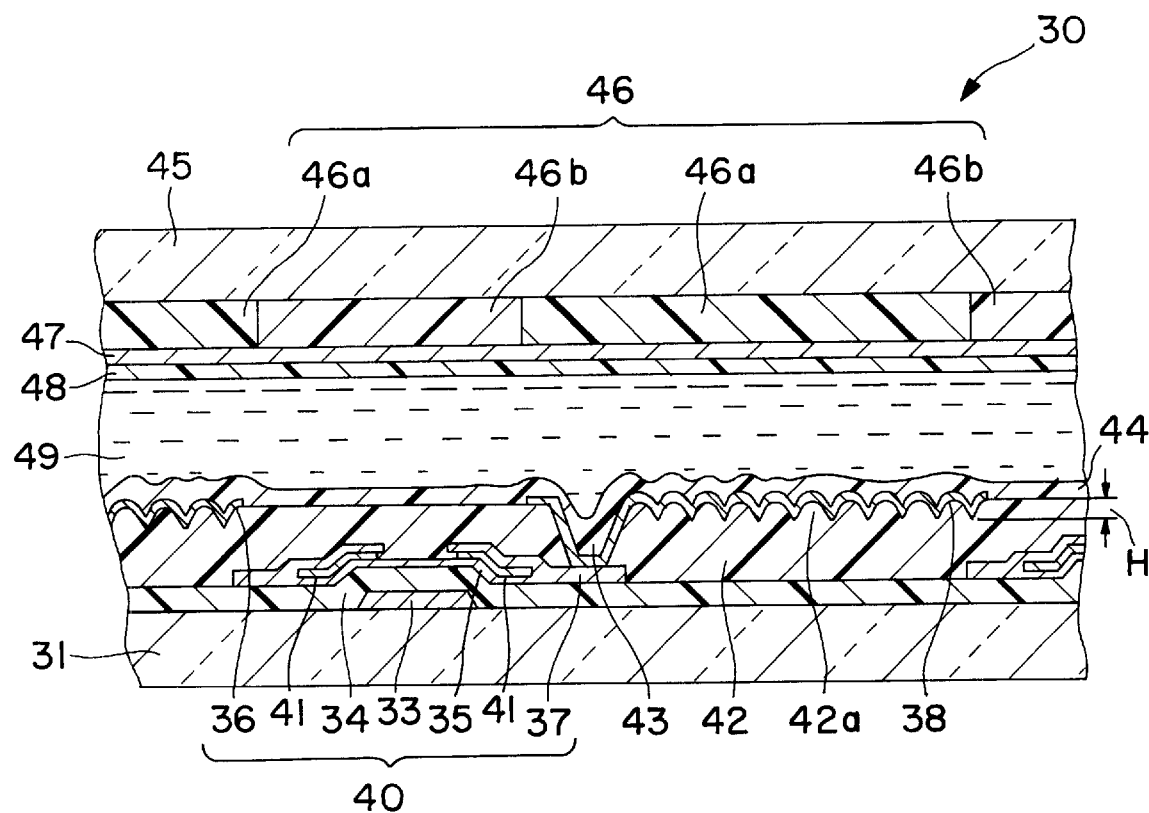
FIG. 1 is a cross-sectional view of a reflection type liquid crystal dispaly device as an embodiment of the invention.
Figure 2:
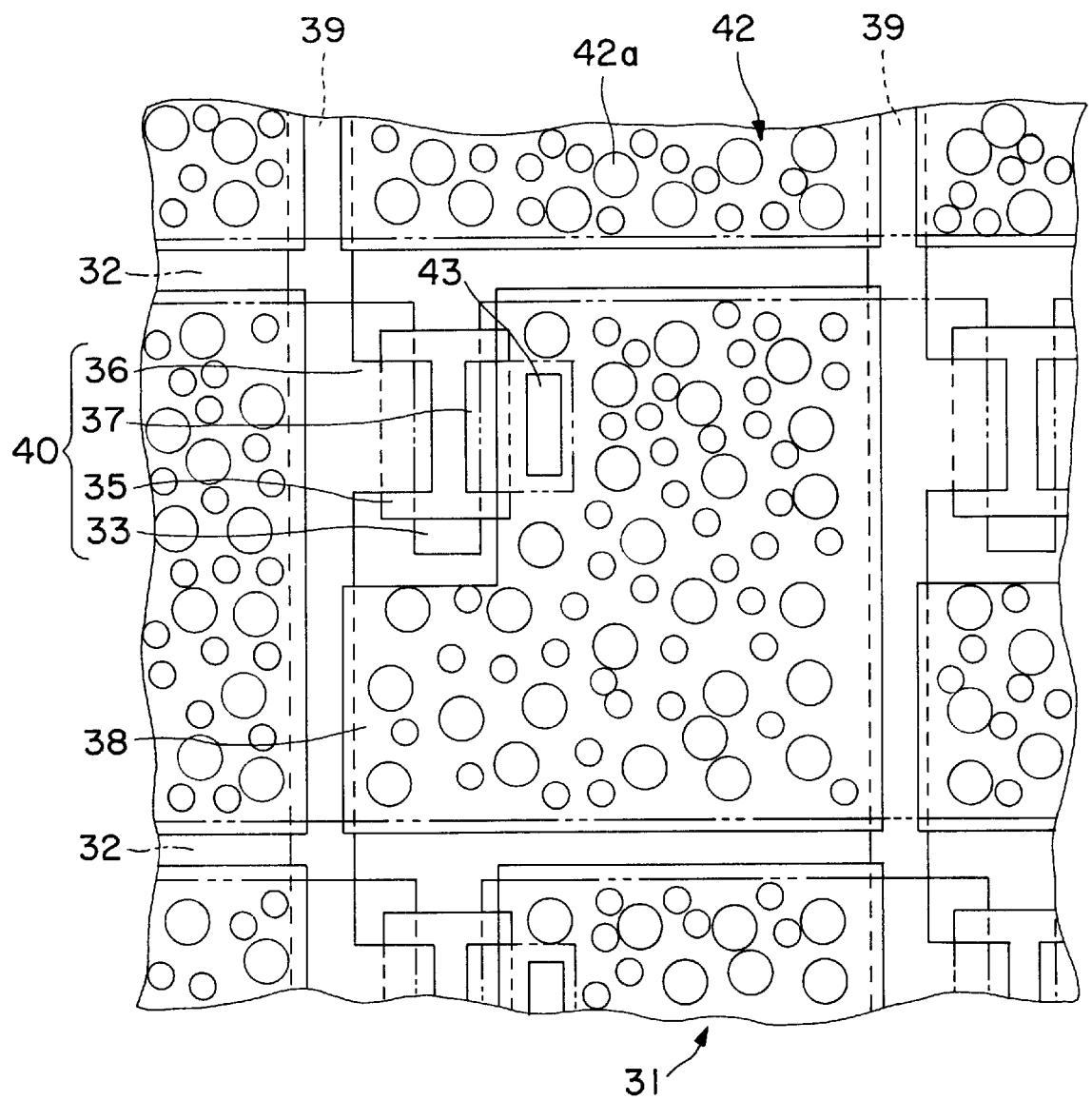
FIG. 2 is a plane view of a substrate 31 shown in FIG. 1.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius; and, unless otherwise indicated, all parts and percentages are by weight.

The entire disclosure of all applications, patents and publications, cited above, and of corresponding European application No. 99103983.4 filed Feb. 17, 1999 is hereby incorporated by reference.

TABLE 2

Abbreviations used for compounds

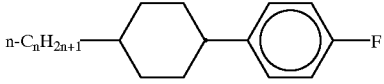 PCH-nF

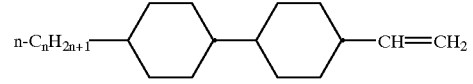 CC-n-V

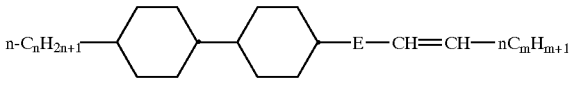 CC-n-Vm

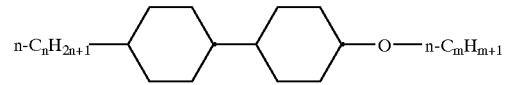 CCH-nOm

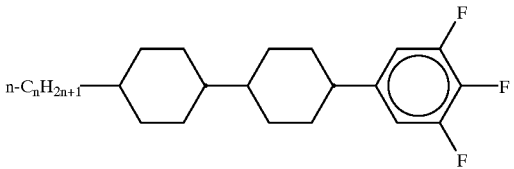 CCP-nF.F.F

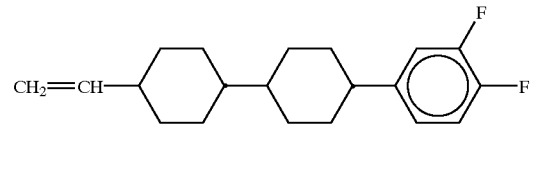 CCG-V-F

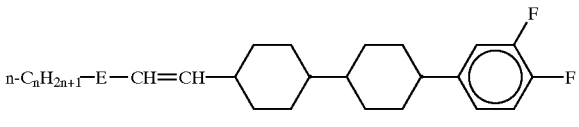 CCG-nV-F

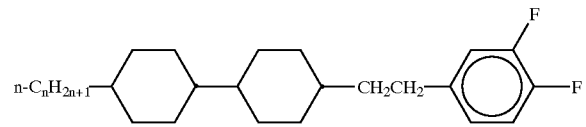 ECCP-nF.F

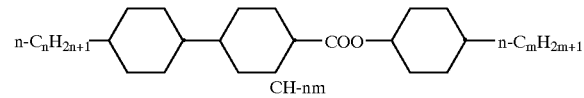 CH-nm

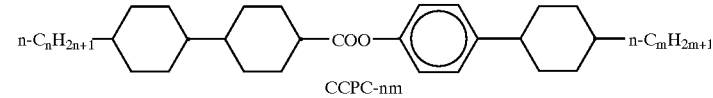 CCPC-nm

EXAMPLE

Liquid crystal mixture 1 was prepared, which has the composition and properties given in the following table (Table 3).

TABLE 3

| Mixture 1 | |
|---|---|
| Composition Compound/Abbreviation | Concentration/% |
| PCH-7F | 8.0 |
| CC-5-V | 17.0 |
| CCH-501 | 16.0 |
| CCP-2F.F.F | 10.0 |
| CCP-3F.F.F | 14.0 |
| CCP-5F.F.F | 6.0 |
| CCG-V-F | 9.0 |
| ECCP-3F.F | 6.0 |
| CH-33 | 3.0 |
| CH-35 | 2.0 |
| CH-43 | 3.0 |
| CCPC-33 | 3.0 |
| CCPC-34 | 3.0 |
| Σ | 100.0 |

TABLE 3-continued

| Mixture 1 | |
|---|---|
| Properties | |
| $T_{(N,I)}$ | 85° C. |
| $T_{(S,N)}$ | < −30° C. |
| Δn (589 nm, 20° C.) | 0.0651 |
| $n_o$ (589 nm, 20° C.) | 1.4776 |
| TN | |
| twist | 90° |
| d · Δn | 0.55 μm |
| $V_{10}$ (0°, 20° C.) | 2.04 V |
| $V_{50}$ (0°, 20° C.) | 2.50 V |
| $V_{90}$ (0°, 20° C.) | 3.12 V |

An active matrix addressed reflective liquid crystal display was realized using mixture 1 doped with cholesteryl-nonanoate (CN).

This display was characterized by a good and almost viewing angle independent contrast in reflective operation. The response times were excellent.

The preceding example can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A liquid crystal display operated in reflective mode, containing a nematic liquid crystal composition with positive dielectric anisotropy, comprising:

5 to 15 % of at least one compound from group 1:
group 1:

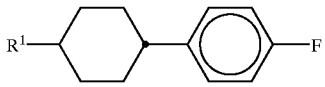

wherein $R^1$ denotes a straight-chain alkyl group of 5 to 7 carbon atoms;

30 to 40% of at least two compounds from group 2:
group 2:

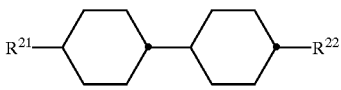

wherein $R^{21}$ denotes a straight-chain alkyl group of 3 to 7 carbon atoms and $R^{22}$ denotes a straight-chain alkoxy group of 1 to 3 carbon atoms or an 1E-alkenyl group with 2 or 3 carbon atoms;

25 to 35% of at least three compounds from group 3:
group 3:

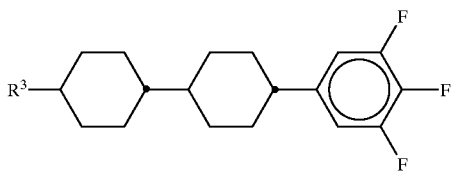

wherein $R^3$ denotes a straight-chain alkyl group of 2 to 5 carbon atoms;

10 to 20% of at least two compounds from group 4:
group 4:

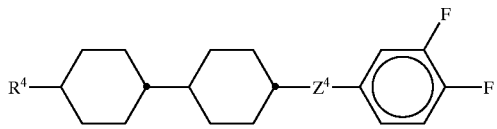

wherein $R^4$ denotes a straight-chain alkyl group or a 1E-alkenyl group, each with 2 or 3 carbon atoms and $Z^4$ denotes a —$CH_2CH_2$—group or a single bond;

8 to 12 % of three compounds of group 5:
group 5:

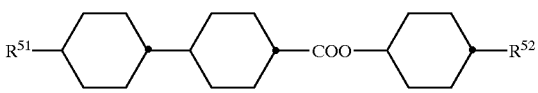

wherein $R^{51}$ denotes n-alkyl with 3 or 4 carbon atoms; and $R^{52}$ denotes n-alkyl with 3 or 5 carbon atoms; and 4 to 8% of at least two compounds of group 6:
group 6:

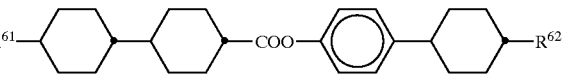

wherein $R^{61}$ denotes n-alkyl with 3 carbon atoms and $R^{62}$ denotes n-alkyl with 3 or 4 carbon atoms.

2. A display according to claim 1, wherein the composition comprises one compound from group 1;
one compound each of subgroups 2a and 2b
subgroup 2a:

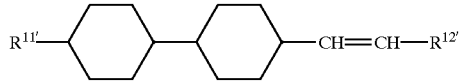

wherein $R^{11'}$ denotes straight-chain alkyl with 3 or 5 carbon atoms and $R^{12'}$ denotes H or $CH_3$,
subgroup 2b:

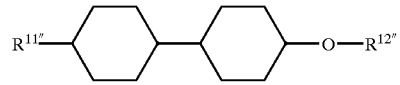

wherein $R^{11'}$ denotes straight-chain alkyl with 3 or 5 carbon atoms, and $R^{12'}$ denotes straight-chain alkyl with 1 or 2 carbon atoms;
three compounds of group 3;
one compound each of subgroups 4a and 4b:
subgroup 4a:

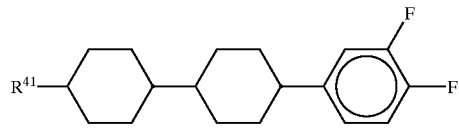

wherein $R^{41}$ denotes n-alkyl with 2 to 5 carbon atoms or 1E-alkenyl with 2 or 3 carbon atoms
subgroup 4b:

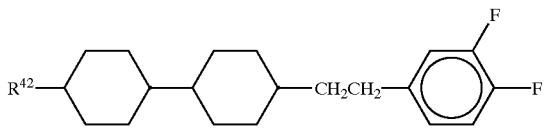

wherein $R^{42}$ denotes n-alkyl with 2 or 3 carbon atoms;
three compounds of group 5, and
two compounds of group 6.

3. A display according to claim 2, wherein $R^1$ is n-heptyl.

4. A display according to claim 2, wherein $R^{11'}$ has 5 carbon atoms.

5. A display according to claim 2, wherein $R^{12'}$ is H.

6. A display according to claim 2, wherein $R^{11''}$ has 5 carbon atoms.

7. A display according to claim 2, wherein $R^{12''}$ has 1 carbon atom.

8. A display according to claim 2, wherein $R^3$ is ethyl, n-propyl or n-pentyl.

9. A display according to claim 2, wherein $R^{41}$ is 1E-alkenyl.

10. A display according to claim 2, wherein $R^{42}$ has 3 carbon atoms.

11. A liquid crystal display, that is a reflective liquid crystal display, containing a nematic liquid-crystal composition with a positive dielectric anisotropy, the liquid-crystalline materials therein being oriented homogeneously, the liquid-crystalline material having a liquid crystal birefringence of 0.06 to 0.116, the liquid-crystalline materials having a twist angle of 40° to 90°, and having a liquid crystal layer optical retardation d·Δn of 170 nm to 290 nm.

12. A liquid crystal display according to claim 11, having a liquid crystal layer thickness d of at least 2.5 μm.

13. A liquid crystal display according to claim 11, having a liquid crystal nematic phase range of at least −20° C. to 80° C.

14. A display according to claim 11, having a birefringence of the liquid-crystal composition of 0.116 or less.

15. A display according to claim 11, having a birefringence of the liquid-crystal composition of 0.096 or less.

16. A display according to claim 11, having a birefringence of the liquid-crystal composition of 0.060 to 0.096.

17. A display according to claim 11, having a dielectric anisotropy of the liquid-crystal composition of 5 to 13.

18. A display according to claim 11, having a dielectric anisotropy of the liquid-crystal composition of 5 to 7.

19. A reflective liquid crystal display comprising a liquid crystal layer having an optical retardation d·Δn of 170nm to 290 nm, said liquid crystal layer comprising a liquid crystal composition, which is oriented in the range of 40° to 90° of the twist angle, comprising:

5 to 15 % of at least one compound from group 1:

group 1:

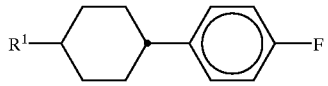

wherein $R^1$ denotes a straight-chain alkyl group of 5 to 7 carbon atoms;

30 to 40% of at least two compounds from group 2:

group 2:

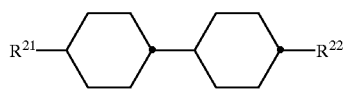

wherein $R^2$ denotes a straight-chain alkyl group of 3 to 7 carbon atoms and $R^{22}$ denotes a straight-chain alkoxy group of 1 to 3 carbon atoms or an 1E-alkenyl group with 2 or 3 carbon atoms;

25 to 35% of at least three compounds from group 3:

group 3:

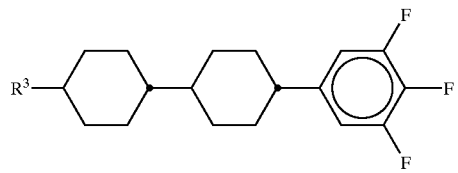

wherein $R^3$ denotes a straight-chain alkyl group of 2 to 5 carbon atoms;

10 to 20% of at least two compounds from group 4:

group 4:

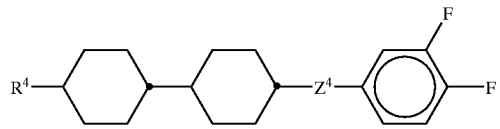

wherein $R^4$ denotes a straight-chain alkyl group or a 1E-alkenyl group, each with 2 or 3 carbon atoms and $Z^4$ denotes a —$CH_2CH_2$—group or a single bond;

8 to 12% of three compounds of group 5:

group 5:

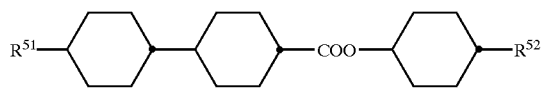

wherein $R^{51}$ denotes n-alkyl with 3 or 4 carbon atoms; and $R^{52}$ denotes n-alkyl with 3 or 5 carbon atoms; and 4 to 8% of at least two compounds of group 6:

group 6:

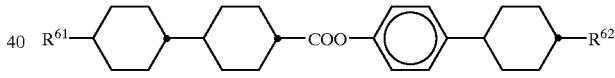

wherein $R^{61}$ denotes n-alkyl with 3 carbon atoms and $R^{62}$ denotes n-alkyl with 3 or 4 carbon atoms.

20. A liquid crystal display, that is a reflective liquid crystal display, containing a nematic liquid-crystal composition with a positive dielectric anisotropy, the liquid-crystalline materials therein being oriented homogeneously, having a liquid crystal nematic phase range of at least −20° C. to 80° C., the liquid-crystalline materials having a twist angle of 40° to 90°, and having a liquid crystal layer optical retardation d·Δn of 170 nm to 290 nm.

21. A liquid crystal display, that is a reflective liquid crystal display, containing a nematic liquid-crystal composition with a positive dielectric anisotropy, the liquid-crystalline materials therein being oriented homogeneously, having a dielectric anisotropy of the liquid-crystal composition of 5 to 13, the liquid-crystalline materials having a twist angle of 40° to 90°, and having a liquid crystal layer optical retardation d·Δn of 170 nm to 290 nm.

22. A liquid crystal display containing a liquid crystal composition with positive dielectric anisotropy, comprising 5 to 15% of at least one compound from group 1:

group 1:

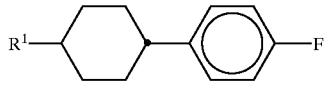

wherein $R^1$ denotes a straight-chain alkyl group of 5 to 7 carbon atoms;

30 to 40% of at least two compounds from group 2:

group 2:

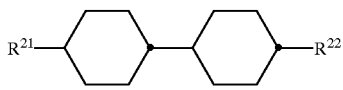

wherein $R^{21}$ denotes a straight-chain alkyl group of 3 to 7 carbon atoms and $R^{22}$ denotes a straight-chain alkoxy group of 1 to 3 carbon atoms or an 1E-alkenyl group with 2 or 3 carbon atoms;

25 to 35% of at least three compounds from group 3:

group 3:

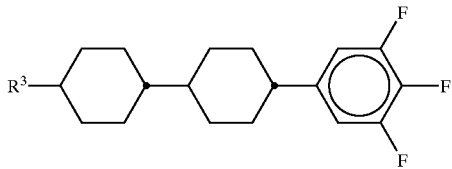

wherein $R^3$ denotes a straight-chain alkyl group of 2 to 5 carbon atoms;

10 to 20% of at least two compounds from group 4:

group 4:

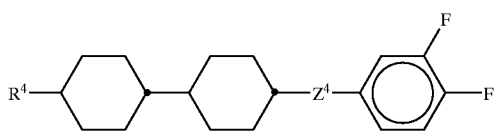

wherein $R^4$ denotes a straight-chain alkyl group or a 1E-alkenyl group, each with 2 or 3 carbon atoms and $Z^4$ denotes a —CH$_2$CH$_2$—group or a single bond;

8 to 12% of three compounds of group 5:

group 5:

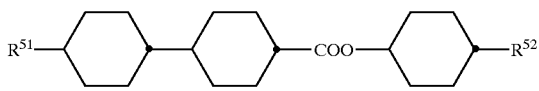

wherein $R^{51}$ denotes n-alkyl with 3 or 4 carbon atoms; and $R^{52}$ denotes n-alkyl with 3 or 5 carbon atoms; and 4 to 8% of at least two compounds of group 6:

group 6:

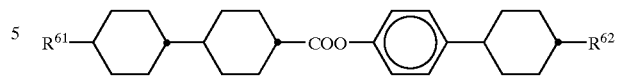

wherein $R^{61}$ denotes n-alkyl with 3 carbon atoms and R62 denotes n-alkyl with 3 or 4 carbon atoms.

23. A liquid crystal display containing a liquid crystal composition with positive dielectric anisotropy, comprising:

5 to 15% of at least one compound from group 1:

group 1:

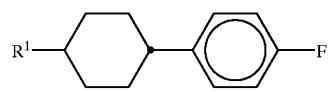

wherein $R^1$ denotes a straight-chain alkyl group of 5 to 7 carbon atoms;

30 to 40% of at least two compounds from group 2:

group 2:

wherein $R^{21}$ denotes a straight-chain alkyl group of 3 to 7 carbon atoms and $R^{22}$ denotes a straight-chain alkoxy group of 1 to 3 carbon atoms or an 1E-alkenyl group with 2 or 3 carbon atoms;

25 to 35% of at least three compounds from group 3:

group 3:

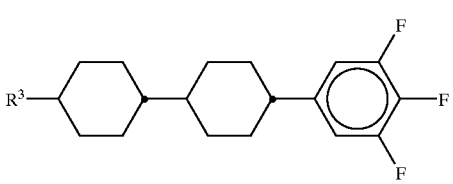

wherein $R^3$ denotes a straight-chain alkyl group of 2 to 5 carbon atoms;

10 to 20% of at least two compounds from group 4:

group 4:

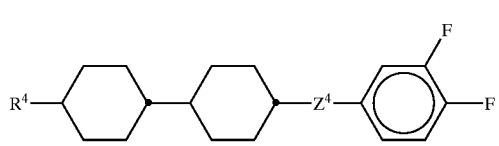

wherein R⁴ denotes a straight-chain alkyl group or a E-alkenyl group, each with 2 or 3 carbon atoms and $Z^4$ denotes a —CH₂CH₂—group or a single bond;

8 to 12% of three compounds of group 5:

group 5:

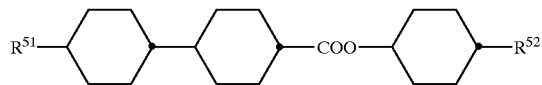

wherein $R^{51}$ denotes n-alkyl with 3 or 4 carbon atoms; and $R^{52}$ denotes n-atkyl with 3 or 5 carbon atoms; and 4 to 8% of at least two compounds of group 6:

group 6:

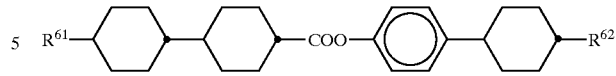

wherein $R^{61}$ denotes n-alkyl with 3 carbon atoms and $R^{62}$ denotes n-alkyl with 3 or 4 carbon atoms.

24. A liquid crystal display,
that is a reflective liquid crystal display,
containing liquid crystals that are oriented in the range of 40° to 90° of the twist angle,
having a twist angle of 40° to 90° and
having a liquid crystal layer optical retardation d·Δn of 170 nm to 290 nm, containing a liquid crystal mixture which is a composition according to claim 1.

* * * * *

UNITED STATES PATENT AND TRADEMARK OFFICE
CERTIFICATE OF CORRECTION

PATENT NO. : 6,524,666 B1
DATED : February 25, 2003
INVENTOR(S) : Hideo Ichinose et al.

It is certified that error appears in the above-identified patent and that said Letters Patent is hereby corrected as shown below:

<u>Column 11,</u>
Line 64, reads "$R^2$," should read -- $R^{21}$ --

Signed and Sealed this

Eighteenth Day of May, 2004

JON W. DUDAS
*Acting Director of the United States Patent and Trademark Office*